(12) United States Patent
Ohtsuki et al.

(10) Patent No.: US 6,976,779 B2
(45) Date of Patent: Dec. 20, 2005

(54) PLANAR LIGHT SOURCE DEVICE AND LIQUID CRYSTAL DISPLAY DEVICE USING THE SAME

(75) Inventors: Hideyo Ohtsuki, Kikuchi-gun (JP); Kunifumi Nakanishi, Kikuchi-gun (JP); Toshiyuki Yoneda, Tokyo (JP)

(73) Assignees: Advanced Display Inc., Kikuchi-gun (JP); Mitsubishi Denki Kabushiki Kaisha, Tokyo (JP)

( * ) Notice: Subject to any disclaimer, the term of this patent is extended or adjusted under 35 U.S.C. 154(b) by 70 days.

(21) Appl. No.: 10/625,652

(22) Filed: Jul. 24, 2003

(65) Prior Publication Data

US 2004/0109664 A1 Jun. 10, 2004

(30) Foreign Application Priority Data

Jul. 26, 2002 (JP) .............................. 2002-217592

(51) Int. Cl.[7] .............................................. F21V 7/04
(52) U.S. Cl. ...................... 362/608; 362/601; 362/612; 362/615; 362/621; 349/68
(58) Field of Search .............................. 362/26–27, 31, 362/234, 293, 555, 561, 601, 608, 612, 615, 362/621; 349/68

(56) References Cited

U.S. PATENT DOCUMENTS

| 3,915,548 | A | * | 10/1975 | Opittek et al. .................. 345/7 |
| 4,870,484 | A | * | 9/1989 | Sonehara .................... 348/791 |
| 4,882,617 | A | * | 11/1989 | Vriens ........................ 348/779 |
| 5,211,463 | A | * | 5/1993 | Kalmanash .................... 362/26 |
| 5,303,322 | A | * | 4/1994 | Winston et al. ............. 385/146 |
| 5,396,406 | A | * | 3/1995 | Ketchpel ..................... 362/27 |
| 5,475,512 | A | * | 12/1995 | Nakazawa et al. ............. 359/13 |
| 5,613,751 | A | * | 3/1997 | Parker et al. .................. 362/31 |
| 5,648,874 | A | * | 7/1997 | Sawaki et al. ............... 359/622 |
| 5,703,667 | A | * | 12/1997 | Ochiai ......................... 349/65 |
| 5,748,828 | A | * | 5/1998 | Steiner et al. .............. 385/146 |
| 5,786,665 | A | * | 7/1998 | Ohtsuki et al. ............. 313/512 |
| 5,806,955 | A | * | 9/1998 | Parkyn et al. ................ 362/31 |
| 5,816,677 | A | * | 10/1998 | Kurematsu et al. ........... 362/31 |
| 5,998,925 | A | * | 12/1999 | Shimizu et al. ............. 313/503 |
| 6,011,602 | A | * | 1/2000 | Miyashita et al. ............ 349/65 |
| 6,020,676 | A | * | 2/2000 | Ury et al. .................... 313/113 |
| 6,044,196 | A | * | 3/2000 | Winston et al. ............. 385/146 |
| 6,072,171 | A | * | 6/2000 | Nakamura et al. .......... 250/216 |
| 6,088,159 | A | * | 7/2000 | Weber et al. ............... 359/487 |
| 6,115,152 | A | * | 9/2000 | Popovich et al. ............. 359/15 |
| 6,144,424 | A | * | 11/2000 | Okuda et al. ................. 349/65 |
| 6,167,182 | A | * | 12/2000 | Shinohara et al. .......... 385/129 |
| 6,196,691 | B1 | * | 3/2001 | Ochiai ......................... 362/31 |

(Continued)

FOREIGN PATENT DOCUMENTS

JP  2000-306411  * 11/2000  ............. F21V 8/00

(Continued)

*Primary Examiner*—Stephen Husar
*Assistant Examiner*—Jason Han
(74) *Attorney, Agent, or Firm*—Oblon, Spivak, McClelland, Maier & Neustadt, P.C.

(57) ABSTRACT

The liquid crystal display device has red, green, and blue LEDs, each emitting a different color light, as a light source. An acrylic lens is mounted on the emission surface of the LED to change angular distributions of light from the LED. The shape of the acrylic lens varies depending on the color of the LED. The angular distribution of emitting light thereby differs by the color of LED to cancel out wavelength dependency of transmittance at each viewing direction in a liquid crystal panel.

15 Claims, 6 Drawing Sheets

U.S. PATENT DOCUMENTS

| | | | |
|---|---|---|---|
| 6,208,466 B1 * | 3/2001 | Liu et al. | 359/584 |
| 6,268,092 B1 * | 7/2001 | Akashi et al. | 430/7 |
| 6,286,970 B1 * | 9/2001 | Egawa et al. | 362/31 |
| 6,301,026 B1 * | 10/2001 | Ueda | 359/15 |
| 6,305,813 B1 * | 10/2001 | Lekson et al. | 362/31 |
| 6,315,440 B1 * | 11/2001 | Satoh | 362/561 |
| 6,345,899 B1 * | 2/2002 | Ohkawa et al. | 362/31 |
| 6,357,903 B1 * | 3/2002 | Furusawa et al. | 362/31 |
| 6,357,904 B1 * | 3/2002 | Kawashima | 362/555 |
| 6,366,409 B1 * | 4/2002 | Umemoto et al. | 359/628 |
| 6,371,623 B1 * | 4/2002 | Toyoda | 362/31 |
| 6,386,720 B1 * | 5/2002 | Mochizuki | 362/31 |
| 6,464,366 B1 * | 10/2002 | Lin et al. | 362/31 |
| 6,480,307 B1 * | 11/2002 | Yang | 359/15 |
| 6,481,130 B1 * | 11/2002 | Wu | 40/546 |
| 6,508,564 B1 * | 1/2003 | Kuwabara et al. | 362/31 |
| 6,522,373 B1 * | 2/2003 | Hira et al. | 349/65 |
| 6,531,230 B1 * | 3/2003 | Weber et al. | 428/480 |
| 6,540,377 B1 * | 4/2003 | Ota et al. | 362/231 |
| 6,550,953 B1 * | 4/2003 | Ichikawa et al. | 315/56 |
| 6,568,822 B2 * | 5/2003 | Boyd et al. | 362/31 |
| 6,601,962 B1 * | 8/2003 | Ehara et al. | 362/31 |
| 6,601,970 B2 * | 8/2003 | Ueda et al. | 362/217 |
| 6,608,332 B2 * | 8/2003 | Shimizu et al. | 257/98 |
| 6,623,132 B2 * | 9/2003 | Lekson et al. | 362/31 |
| 6,654,082 B1 * | 11/2003 | Sohda et al. | 349/106 |
| 6,669,350 B2 * | 12/2003 | Yamashita et al. | 362/31 |
| 6,672,733 B2 * | 1/2004 | Nagatani | 362/31 |
| 6,672,734 B2 * | 1/2004 | Lammers | 362/31 |
| 6,676,268 B2 * | 1/2004 | Ohkawa | 362/31 |
| 6,700,634 B2 * | 3/2004 | Taniguchi et al. | 349/65 |
| 6,712,482 B2 * | 3/2004 | Kawakami et al. | 362/31 |
| 6,781,648 B2 * | 8/2004 | Takahashi et al. | 349/68 |
| 6,788,358 B1 * | 9/2004 | Kim et al. | 349/62 |
| 6,791,636 B2 * | 9/2004 | Paolini et al. | 349/61 |
| 6,805,468 B2 * | 10/2004 | Itoh et al. | 362/362 |
| 6,848,801 B2 * | 2/2005 | Miyashita | 362/31 |
| 2001/0043163 A1 * | 11/2001 | Waldern et al. | 345/7 |
| 2001/0055208 A1 * | 12/2001 | Kimura | 362/260 |
| 2003/0016521 A1 * | 1/2003 | Wang et al. | 362/31 |
| 2003/0043567 A1 * | 3/2003 | Hoelen et al. | 362/31 |
| 2003/0147151 A1 * | 8/2003 | Hwang | 359/742 |
| 2004/0108971 A1 * | 6/2004 | Waldem et al. | 345/8 |
| 2004/0136038 A1 * | 7/2004 | Holmes et al. | 359/15 |
| 2004/0170011 A1 * | 9/2004 | Kim et al. | 362/31 |

FOREIGN PATENT DOCUMENTS

| | | | | |
|---|---|---|---|---|
| JP | 2001-035229 | * | 2/2001 | F21V 8/00 |
| JP | 2001-043721 | * | 2/2001 | F21V 8/00 |
| WO | WO98/19105 | | 5/1998 | |

* cited by examiner

US 6,976,779 B2

PLANAR LIGHT SOURCE DEVICE AND LIQUID CRYSTAL DISPLAY DEVICE USING THE SAME

BACKGROUND OF THE INVENTION

1. Field of the Invention

The present invention relates to a planar light source device and a liquid crystal display device, and more specifically to a liquid crystal display device with enhanced viewing angle characteristics.

2. Description of Related Art

A liquid crystal display device has a liquid crystal panel comprising two substrates with a liquid crystal layer interposed therebetween. A planar light source device is mounted on the back of the liquid crystal panel. A twisted nematic (TN) mode is widely used in the liquid crystal panel, where liquid crystal molecules are aligned substantially parallel to the substrates in a quiescent state with a twist angle of given value and twist at the substrates according to an applied signal voltage.

A light source of the planar light source device is conventionally a linear cold-cathode tube. Recently, a light emitting diode (LED) also comes into use because of its longer life and good light emission. When using the LED as a light source, three LEDs of red, green, and blue are provided, each in a plurality of numbers. The angles of light from the three colors of the LEDs are substantially the same. The light emitting angle of light sources affects the viewing angle of the planar light source; a wider emission angle of light from the LED allows a wider viewing angle. Accordingly, the wavelength dependence of luminance at each angle of viewing direction in the conventional planar light source device using the LEDs is as shown in FIG. 11A. The luminance decreases as an angle of viewing direction becomes larger but remains substantially constant for any wavelength.

FIG. 11B shows the wavelength dependence of luminance at each angle of viewing direction in a conventional TN mode liquid crystal display device having the planar light source device using the LEDs. When viewing the liquid crystal display device from the same angle, the luminance of shorter wavelength light is lower relative to that of longer wavelength light, resulting in a reddish tone over all. Further, as the angle of viewing direction increases, the luminance differs more significantly depending on wavelength, causing color shift problem.

As described above, the conventional liquid crystal display device has a problem of color shift depending on angles of viewing direction.

SUMMARY OF THE INVENTION

The inventors have found that when a planar light source device using LEDs is applied to a TN mode liquid crystal display device, the viewing angle characteristics of the liquid crystal display device are determined by the relation of the viewing angle characteristics of the planar light source device and a liquid crystal display panel. In the TN mode liquid crystal panel, a light transmittance varies depending on a viewing direction and wavelength. FIG. 10 shows the wavelength dependence of transmittance at each viewing direction in the TN mode liquid crystal panel. In FIG. 10, the horizontal axis is a wavelength and the vertical axis is a transmittance of the liquid crystal panel. The transmittance when viewing from a display normal (at the angle of 0 degree) is standardized as 1, and the transmittances at the angles of 20, 40, and 60 degrees with respect to the normal to the panel are shown. The larger is the angle of viewing direction, the smaller is the ratio of the transmittance at the shorter wavelength to at the longer wavelength. The viewing angle characteristics of the TN mode liquid crystal display device using the LEDs shown in FIG. 11B is expressed as the product of the luminance distribution of the planar light source device shown in FIG. 11A and the transmittance of the liquid crystal display panel shown in FIG. 10.

Accordingly, an object of the present invention is to provide a liquid crystal display device with less color shift when changing viewing directions, and a planar light source device used for the same.

A planar light source device according to the present invention has a plurality of light sources emitting different colors of light, and a light guide plate receiving light from the plurality of light sources at a side face to distribute the light over a surface thereof. A light emission angle differs among the plurality of light sources. So the planar light source device can have an angular dependency of each light. The planar light source device can be made to have an arbitrary angular dependency of color.

The planar light source device can have a refractor mounted on an emission surface of each of the plurality of light sources for changing a direction of light. The refractor has a different shape for the different light sources.

In the planar light source device, the amount of the emitted light from the light sources with longer wavelength can be concentrated in narrow range around the center of viewing angle as it is compared with that with shorter wavelength.

In the planar light source, the plurality of light sources can be red, green, and blue light emitting diodes.

A liquid crystal display device according to the present invention has the planar light source device, and a liquid crystal panel placed above an emission surface of the planar light source. The liquid crystal panel has two substrates with a liquid crystal layer interposed therebetween. The liquid crystal display device allows less color shift when changing viewing directions.

In the liquid crystal display device, the different light sources can have different light emission angles in order that wavelength dependence of transmittance at a viewing direction in the liquid crystal panel is canceled out by wavelength dependence of luminance at the viewing direction in the planar light source device.

Another planar light source device according to the present invention has a plurality of light sources emitting different colors of light, a light guide plate receiving light from the plurality of light sources at side face to distribute the light over a surface thereof, and a refractor refracting light from the plurality of light sources with different refraction angles for different colors. The planar light source device allows less color shift when changing viewing directions.

In the planar light source device, the refractor can be formed on a side face of the light guide plate facing the plurality of light sources. The refractor has a different shape for the different light sources.

The planar light source device can have a prism plate mounted between the plurality of light sources and the light guide plate. The refractor can be formed on a side face of the prism plate facing the plurality of light sources. The refractor has a different shape for the different light sources.

In the planar light source device, a refraction angle of longer wavelength light can be smaller than a refraction angle of shorter wavelength light.

In the planar light source device, the plurality of light sources can be red, green, and blue light emitting diodes.

Another liquid crystal display device according to the present invention has the planar light source device, and a liquid crystal panel placed above an emission surface of the planar light source. The liquid crystal panel has two substrates with a liquid crystal layer interposed therebetween. The liquid crystal display device allows less color shift when changing viewing directions.

In the liquid crystal display device, the different light sources can have different light emission angles in order that wavelength dependence of transmittance at a viewing direction in the liquid crystal panel is canceled out by wavelength dependence of luminance at the viewing direction in the planar light source device.

Another planar light source device according to the present invention has a light source, a light guide plate receiving light from the plurality of light sources at a side face to distribute the light over a surface thereof, and a hologram diffracting different light at different angles. The planar light source device can be made to have an arbitrary angular dependency of color.

In the planar light source device, the hologram can be placed between the light source and the light guide plate.

In the planar light source device, the hologram can be placed above an emission surface of the light guide plate.

In the light source device, longer wavelength light is diffracted arbitrarily and differently from shorter wavelength of light. Especially, the hologram can diffract longer wavelength light at an angle while diffract shorter wavelength light at a larger angle than the angle of the longer wavelength light.

Another liquid crystal display device according to the present invention has the planar light source device, and a liquid crystal panel placed above an emission surface of the planar light source. The liquid crystal panel has two substrates with a liquid crystal layer interposed therebetween. The liquid crystal display device allows less color shift when changing viewing directions.

In the liquid crystal display device, the hologram can be arranged in order that wavelength dependence of transmittance at a viewing direction in the liquid crystal panel is canceled out by wavelength dependence of luminance at the viewing direction in the planar light source device.

The present invention will become more fully understood from the detailed description given hereinbelow and the accompanying drawings which are given by way of illustration only, and thus are not to be considered as limiting the present invention.

DESCRIPTION OF THE PREFERRED EMBODIMENTS

First Embodiment

Figure 1:
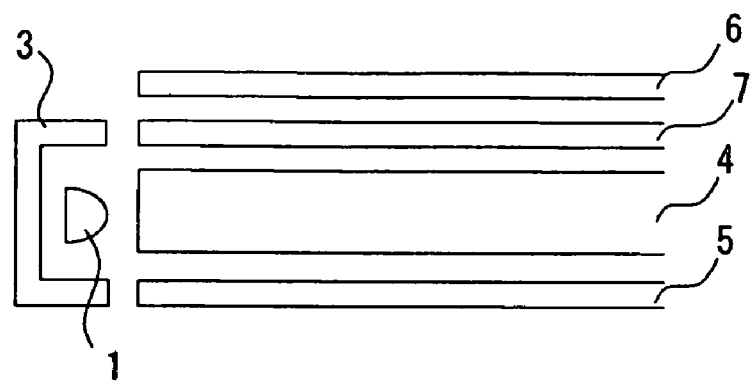
FIG. 1 is a sectional view showing a configuration of the liquid crystal display device according to the present invention.
Figure 2:
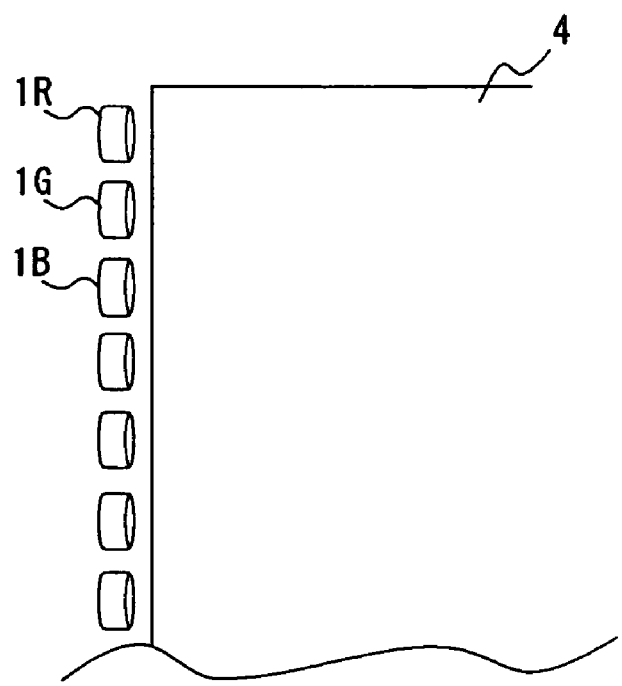
FIG. 2 is a plan view of the light source part of the liquid crystal display device according to the present invention.

A configuration of the liquid crystal display device according to the present invention will be explained hereinafter with reference to FIG. 1. FIG. 1 is a sectional view of the liquid crystal display device having red, green, and blue LEDs as light sources. FIG. 2 is an enlarged view of the area of the LEDs. The liquid crystal display device has a LED 1, a reflector 3, a light guide plate 4, a reflection sheet 5, a liquid crystal panel 6, and an optical sheet 7. Reference symbols R, G, and B after the reference numeral indicate red, green, and blue, respectively.

A plurality of the R, G and B LEDs are provided to produce white light by their combination. The LED 1R emits red light having wavelength $\lambda$ of approximately 600 to 680 nm, the LED 1G emits green light having wavelength $\lambda$ of approximately 500 to 600 nm, and the LED 1B emits blue light having wavelength $\lambda$ of approximately 430 to 500 nm. The light emitted from each color of the LEDs 1 enters a side face of the light guide plate 4 directly or after reflected by the reflector 3. The light then transmits through the light guide plate 4, repeating total internal reflection. During the transmission, a portion of the light is scattered by microdots on the bottom surface of the light guide plate 4 and exits from the exit surface. The output light from the bottom surface opposite to the exit surface is reflected by the reflection sheet 5 to reenter the light guide plate 4.

The light from the exit surface of the light guide plate 4 passes through the optical sheet 7 such as a diffusion sheet, protection sheet, lens sheet, prism sheet having an uneven pattern on the side facing to or opposite to the light guide plate, and so on. The light then enters the liquid crystal panel 6 having a CF substrate and a TFT array substrate. A liquid crystal layer is interposed between the substrates. The CF substrate has a color filter having red, green, and blue sections, and a light blocking layer (black matrix or BM). The TFT array substrate has a switching element and a pixel electrode. The switching element is turned on and off to apply a signal voltage to the liquid crystal layer to control alignment of liquid crystal molecules. The light reaching the liquid crystal panel 6 is thereby modulated according to a display signal to display red, green, and blue.

Figure 10:
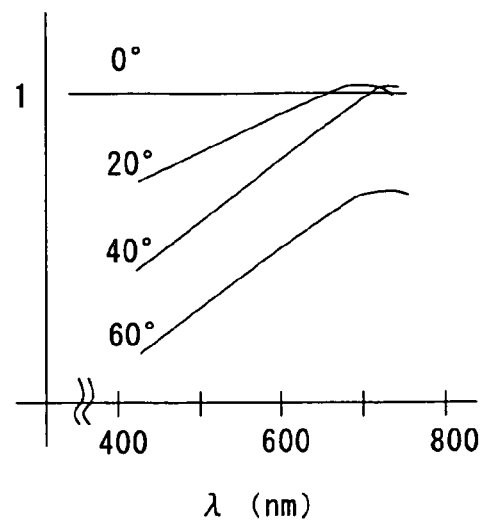
FIG. 10 is a view showing the wavelength dependence of transmittance at each angle of viewing direction in a liquid crystal panel.
Figure 11A:
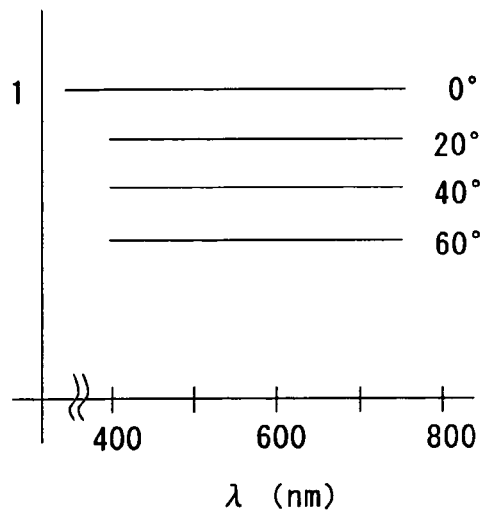
FIG. 11A is a view showing the wavelength dependence of luminance at each angle of viewing direction in a conventional planar light source device.
Figure 11B:
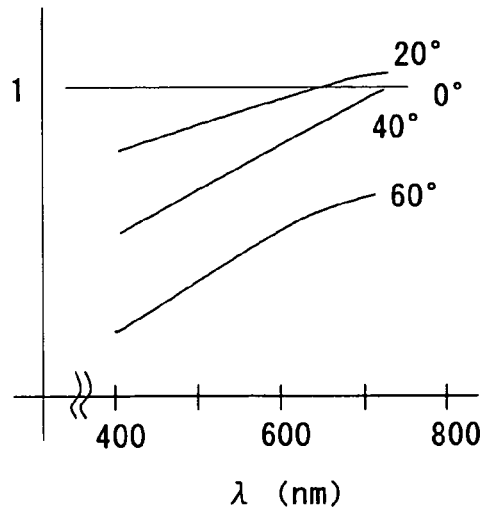
FIG. 11B is a view showing the wavelength dependence of luminance at each angle of viewing direction in a conventional liquid crystal display device.

FIG. 10 shows the wavelength dependence of transmittance at each viewing direction (viewing angle characteristics) in the liquid crystal panel 6. In FIG. 10, the horizontal axis is a wavelength and the vertical axis is a transmittance of the liquid crystal panel 6. The transmittance when viewing from a display normal (at the angle of 0 degree) is standardized as 1, and the transmittances at the angles of 20, 40, and 60 degrees with respect to the normal to the panel are shown. The larger is the angle of viewing direction, the smaller is the ratio of the transmittance at the shorter wavelength to at the longer wavelength.

Figure 3A:
FIG. 3A is an enlarged view showing the shapes of LEDs in the liquid crystal display device according to the first embodiment of the present invention.
Figure 3B:
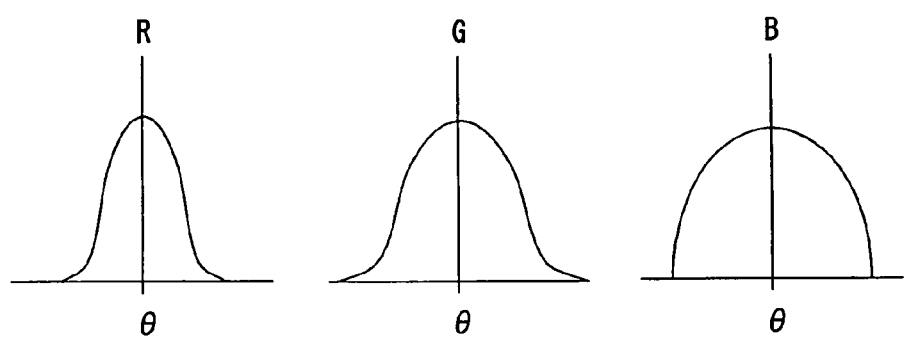
FIG. 3B is a view showing distributions of emission angles of light from the LEDs in the liquid crystal display device according to the present invention.

The LEDs 1 are placed in a line along the side face of the light guide plate 4. The LEDs 1 are arranged to produce even white light over all by their combination. The number of each three colors of the LEDs 1 is not necessarily equal as long as the chromaticity of the white light falls within a given range. Arrangement of the LEDs 1 is not necessarily in the order of red, green, and blue, and they are arranged to create even white light over the entire plane. The emission angular distribution of light from the LEDs 1 will be explained hereinafter with reference to FIGS. 3A and 3B. FIG. 3A is an enlarged view of the LEDs 1, and FIG. 3B shows distributions of light emission angles of the LEDs 1. Generally, the red, green, and blue LEDs 1 have substantially the same angular distribution. In the present invention, an acrylic lens 2 is mounted on the emission surface of the LED 1. The shape of the acrylic lens 2 is different in each color of the LEDs 1 as shown in FIG. 3A. The LED 1R emitting red light is provided with a dome-shaped acrylic lens 2R whose curvature is the largest of the three. The angle of emission light from the LED 1R thereby becomes narrower as shown in FIG. 3B to emit highly directional red light.

On the emission surface of the LED 1B emitting blue light is mounted a flat acrylic lens 2B whose curvature is the smallest of the three. The angle of emission light from the LED 1B thereby becomes wider as in FIG. 3B to emit blue light with low directivity. A dome-shaped acrylic lens 2G mounted on the LED 1G emitting green light has an intermediate curvature; thus, the green light has an intermediate directivity between the red light and blue light.

Figure 3C:
FIG. 3C is an enlarged view showing other shapes of LEDs in the liquid crystal display device according to the first embodiment of the present invention.

The acrylic lens 2 needs to transmit light from the LED 1 and have a different refractive index from air. It is not necessarily formed by acrylic material, and a UV curable resin, glass, quartz, and the like can be also used. Further, the acrylic lens 2 is not necessarily dome-shaped, and it can be angle-shaped whose apex angle is different in each color as shown in FIG. 3C. Furthermore, the acrylic lens 2 is not limited to have the shapes shown in the figures, and it can have another shape as long as a light emission angular distribution differs among the three colors of the LEDs 1. It is also possible to mount a refraction member of the same shape with a different refractive index on each color of the LEDs 1 to obtain a different angular distribution among the three colors of the LEDs 1.

Figure 4A:
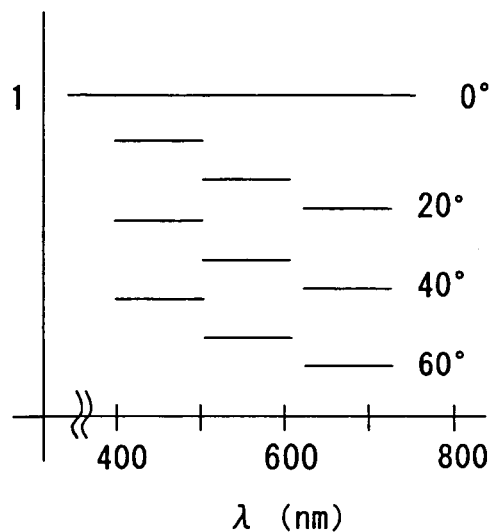
FIG. 4A is a view showing the wavelength dependence of luminance at each angle of viewing direction in the planar light source device according to the present invention.
Figure 4B:
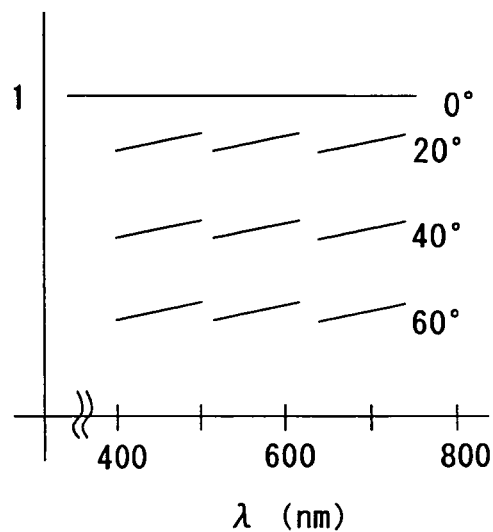
FIG. 4B is a view showing the wavelength dependence of luminance at each angle of viewing direction in the liquid crystal display device according to the present invention.

The light having the above angular distribution passes through the light guide plate 4 and the optical sheet 7. The wavelength dependence of luminance at each viewing direction at the emission surface of the planar light source is as shown in FIG. 4A. FIGS. 4A and 4B show the wavelength dependence of luminance of light at the angles of 20, 40, and 60 degrees with respect to the normal to the panel where the luminance when viewing from the display normal is standardized as 1. Since the angles of emission light from the three colors of the LED 1 are substantially equal over the entire wavelength region as shown in FIG. 4A, the wavelength dependence of luminance exhibits three levels of luminance for each color of the LEDs in each viewing direction. The larger is the angle of viewing direction, the larger is the ratio of the luminance at the shorter wavelength to at the longer wavelength.

The wavelength dependence of luminance of emission light at each viewing direction in the liquid crystal display device is represented by the product of the viewing angle characteristics of transmittance in the liquid crystal panel 6 shown in FIG. 10 and the viewing angle characteristics of luminance in the planar light source shown in FIG. 4A. The viewing angle characteristics of luminance of each color light in the liquid crystal display device are as shown in FIG. 4B. The viewing angle characteristics of transmittance of the liquid crystal panel 6 and the viewing angle characteristics of luminance of the planar light source cancel out each other. Thus, while the luminance of emission light changes depending on the viewing direction, a relative ratio of the luminance between wavelengths remains substantially constant. Therefore, the changing viewing directions do not cause a significant change in a luminance ratio between wavelengths, thus suppressing color shift. The liquid crystal display device with enhanced display characteristics can be thereby obtained.

Second Embodiment

A planar light source device in the liquid crystal display device according to the second embodiment of the present invention also cancels out the wavelength dependence of transmittance at each viewing direction in the liquid crystal panel 6 shown in FIG. 10 by the wavelength dependence of luminance of emission light at each viewing direction in the planar light source device. The liquid crystal display device thereby exhibits substantially uniform color tone regardless of viewing direction.

Figure 5:
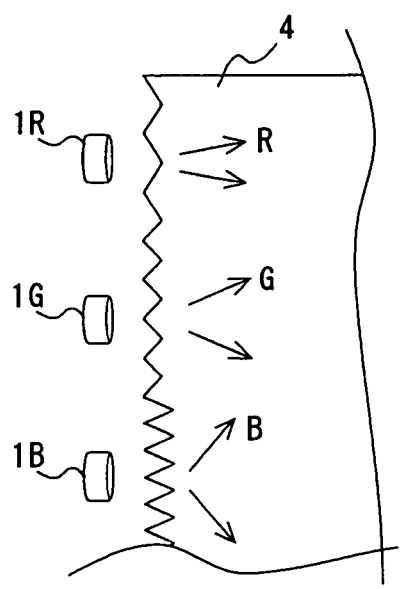
FIG. 5 is a view showing the shape of a side face of the light guide plate according to the second embodiment of the present invention.

The liquid crystal display device according to the second embodiment will be explained hereinafter with reference to FIG. 5. The same reference numeral as in FIGS. 1 and 2 denotes the same element and redundant description will be omitted. The configuration of the liquid crystal display device according to the second embodiment is substantially the same as the configuration according to the first embodiment shown in FIGS. 1 and 2. The wavelength dependence of transmittance at each viewing direction in the liquid crystal panel 6 is as shown in FIG. 10 just like in the first embodiment. In the present embodiment, however, the LED 1 is not provided with the acrylic lens 2, and the shape of the side face of the light guide plate 4 differs instead.

The LEDs 1 of red, green, and blue are placed as light sources along the side of the light guide plate 4. A line of ridges (prism structures) are formed on the side face of the light guide plate 4 facing the LEDs 1 in the thickness direction of the light guide plate 4 as shown in FIG. 5. The prism-shaped edge spreads light out more broadly. The smaller the apex angle of the ridge is, the more broadly the light is spread out.

The ridges formed on the side face of the light guide plate 4 facing the LED 1R have large apex angles for narrower spread of light. The ridges formed on the side face facing the LED 1B have narrow apex angles, and the ridges on the side face facing the LED 1G have intermediate apex angles between the two. The spread of light from the exit surface of the light guide plate 4 reflects the spread of the light transmitting through the light guide plate 4. Therefore, providing the prism structures at the side face of the light guide plate 4 allows the distribution of light emission angles of the planar light source to vary by wavelength.

The wavelength dependence of luminance at each viewing direction in the planar light source device having the above light guide plate 4 is as shown in FIG. 4A just like in the first embodiment. The wavelength dependence of luminance of emission light in the liquid crystal display device is as shown in FIG. 4B. Therefore, a luminance ratio between wavelengths remains substantially constant when changing viewing directions, thus suppressing color shift. The liquid crystal display device with enhanced display characteristics can be thereby obtained. The side face of the light guide plate 4 is not limited to be prism-shaped as shown in the figures. It can have another shape, including a curved and rough shape, capable of changing the spread angle of light according to the color of the LEDs.

Third Embodiment

Figure 6A:
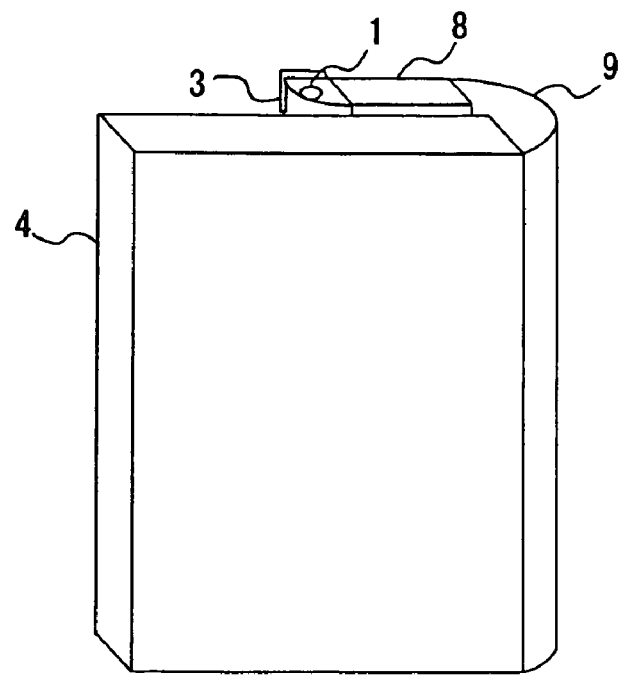
FIG. 6 is a view showing a configuration of the liquid crystal display device according to the third embodiment of the present invention.

The liquid crystal display device according to the third embodiment of the present invention will be explained hereinbelow with reference to FIG. 6A. The same reference numeral as in FIGS. 1 and 2 denotes the same element and redundant description will be omitted. In the liquid crystal display device according to the present embodiment, the LEDs 1 of red, green, and blue as light sources are placed in a row along the middle line on the back of the light guide plate 4. The light from the LEDs 1 enters a prism plate 8 directly or after reflected by the reflector 3. In the prism plate 8, the light is spread and transmits through it, then exits from the opposite surface of the entrance surface. The light is reflected by the second reflector 9 to enter the light guide plate 4. The light then exits from the exit surface of the light guide plate 4, and passes through an optical sheet (not shown).

The spread of the light transmitting through the light guide plate 4 has a dependency on the spread of the light transmitting through the prism plate 8. A longer prism plate in which light transmits longer distances makes the light colors more mixed when entering the light guide plate 4. It reduces an uneven brightness problem caused by discrete arrangement of the LEDs 1, thus improving display quality.

Figure 6B:
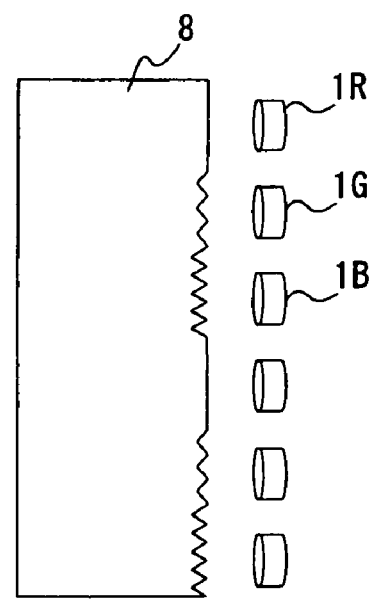

FIG. 6B shows an enlarged view of the side face of the prism plate 8 facing the LEDs 1. A line of ridges (prism structures) are formed on the side face. The ridges spread light out more broadly as described in the second embodiment. The smaller the apex angle of the ridge is, the more broadly the light is spread out. The side face facing the LED 1R is a plane surface, not ridge-shaped. The ridges formed on the side face facing the LED 1B have narrow apex angles, while the ridges on the side face facing the LED 1G have wider apex angles. Therefore, the spread angle of light varies by the color of the LEDs 1.

The wavelength dependence of luminance of light emitted by the planar light source device having the above prism plate 8 at each viewing direction is as shown in FIG. 4A. The wavelength dependence of luminance in the liquid crystal display device is as shown in FIG. 4B just like in the first and second embodiments. Therefore, a luminance ratio between wavelengths remains substantially constant when viewing directions are changed, thus suppressing color shift. The liquid crystal display device with enhanced display characteristics can be thereby obtained. The side face of the prism plate 8 is not limited to be prism-shaped, but it can have any shape to change the spreading angle of light.

Fourth Embodiment

Figure 7:
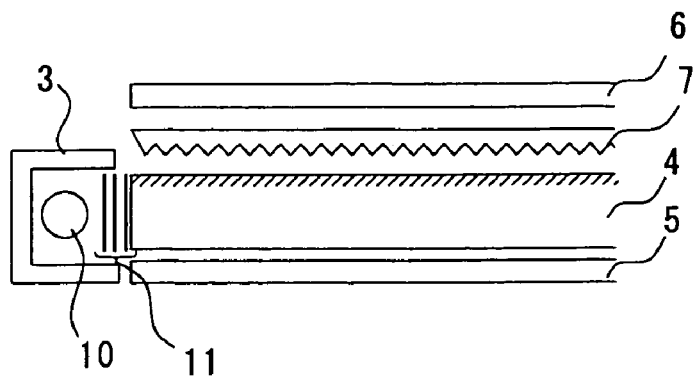
FIG. 7 is a view showing a configuration of the liquid crystal display device according to the fourth embodiment of the present invention.

A configuration of the liquid crystal display device according to the fourth embodiment of the present invention will be explained hereinafter with reference to FIG. 7. FIG. 7 is a sectional view of the liquid crystal display device according to the present embodiment. The same reference numeral as in FIG. 1 denotes the same element and redundant description will be omitted. The liquid crystal display device has a fluorescent lamp 10 and a hologram sheet 11.

The fourth embodiment differs from the first embodiment in that a light source is not a LED but a fluorescent lamp 10 and that a hologram sheet 11 is provided between the light guide plate 4 and the fluorescent lamp 10. White light emitted from the fluorescent lamp 10 passes through the hologram sheet 11 and enters the side face of the light guide plate 4. The light is then emitted as described in the first embodiment.

In the planar light source device according to the fourth embodiment, the three hologram sheets 11 are provided between the light guide plate 4 and the fluorescent lamp 10. The hologram sheet 11 selectively diffracts specific wavelength light. Each of the three hologram sheets 11 diffracts each of red, blue, and green wavelength light. The hologram sheets 11 give the red light the highest directivity, the green light the next highest directivity, and the blue light the lowest directivity. Therefore, the red light becomes highly directional with narrow angular distribution. The blue light, on the other hand, becomes non-directional with broad angular distribution. The green light has the intermediate directivity with intermediate angular distribution between the two. The angular distribution of the light entering the light guide plate 4 is as shown in FIG. 3B. Therefore, the wavelength dependence of luminance at each viewing direction in the planar light source is as shown in FIG. 4A just like in the first embodiment. The wavelength dependence of luminance at each viewing direction in the liquid crystal display device is as shown in FIG. 4B. Therefore, a luminance ratio between wavelengths remains substantially constant when changing viewing directions, thus suppressing color shift. The liquid crystal display device with enhanced display characteristics can be thereby obtained.

In this embodiment, a light source is not limited to the fluorescent lamp, and the same advantage can be obtained when using a cold-cathode tube, RGB LEDs, and the like. Also, the number of the hologram sheet 11 is not limited to three, and the same advantage can be obtained when using at least one sheet to diffract specific wavelength light. Further, the hologram sheet 11 is not necessarily provided between the light guide plate 4 and the fluorescent lamp 1; for example, it can be provided between the light guide plate 4 and the optical sheet 7, in the optical sheet, between the optical sheet 7 and the liquid crystal panel 6, and so on.

Fifth Embodiment

Figure 8:
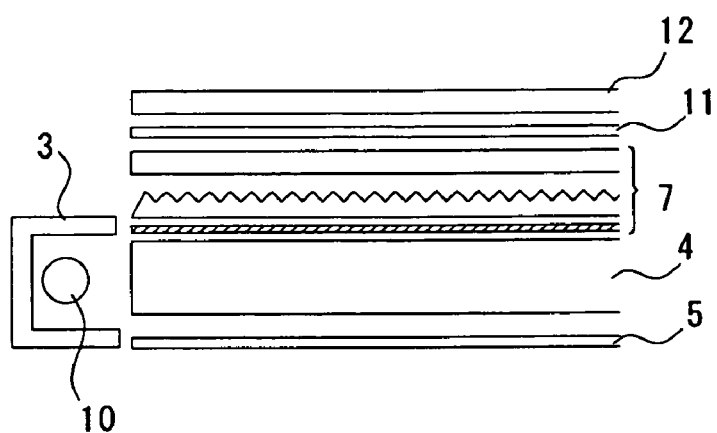
FIG. 8 is a view showing a configuration of the liquid crystal display device according to the fifth embodiment of the present invention.
Figure 9:
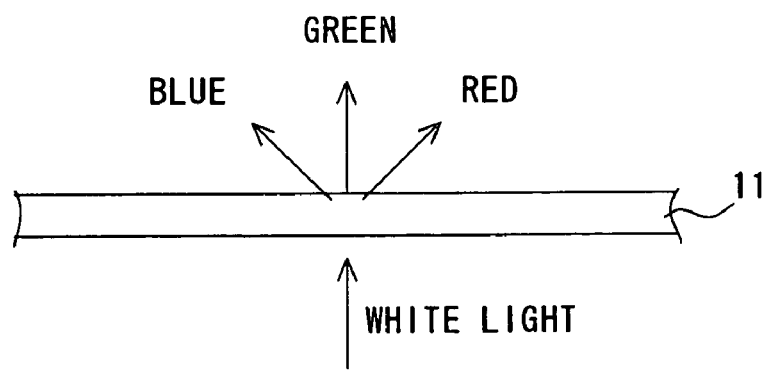
FIG. 9 is a view showing an example of light passing through a hologram sheet.

A configuration of the planar light source device according to the fifth embodiment of the present invention will be explained hereinafter with reference to FIG. 8. FIG. 8 is a section view of the planar display device. The same reference numeral as in FIGS. 1 and 7 denotes the same element and redundant description will be omitted. Compared with a liquid crystal display device, the planar display device has a pattern plate 12 instead of a liquid crystal panel.

White light emitted from the fluorescent lamp 10 enters a side face of the light guide place 4 directly or after reflected by the reflector 3. The light transmits through the light guide plate 4 and exits from the entire exit surface. The output light from the bottom surface opposite to the exit surface of the light guide plate 4 is reflected by the reflective sheet 5 to reenter the light guide plate 4. The light from the exit surface of the light guide plate 4 then passes through the optical sheet 7. The optical sheet 7 is composed of a diffusion sheet and two prism sheets. The light which is highly directional in the vertical direction is thereby obtained. On the optical sheet 7 is provided the hologram sheet 11. The hologram sheet 11 changes the directions of the white light according to the wavelength.

On the hologram sheet 11 is provided a pattern plate 12 having a given pattern. A display plate with varying color tone according to viewing direction is thereby obtained. The planar light source device is applicable to the display plate exhibiting different color tone when changing viewing directions.

Other Embodiments

Though the above embodiments have explained a case where each of red, green, and blue light has a different emission angle, the same advantage can be obtained when at least one color light has a different emission angle. The same advantage can also be obtained when each of red, green, and blue LEDs has a different light emission angle. The shapes of the acrylic lens 2, the side face of the light guide plate 4, and the prism plate 8 are not limited to those shown in the figures. It is also possible to combine the above embodiments.

As explained in the foregoing, the present invention provides a liquid crystal display device with less color shift when changing viewing directions, and a planar light source device with intentional color shift.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A planar light source device, comprising:
a plurality of light sources each configured to emit different colors of light having different light emission angular distribution; and
a light guide plate configured to receive the different colors of light having the different light emission angular distribution from the plurality of light sources at a side face and to distribute the light over a surface thereof.

2. A planar light source device according to claim 1, comprising a refractor mounted on an emission surface of each of the plurality of light sources, each of the refractors being configured with a different shape for the different light sources and providing the different angular distribution for the different light sources.

3. A planar light source device according to claim 1, wherein the light emission angular distribution of a light source of the plurality of light sources emitting longer wavelength light is smaller than the light emission angular distribution of a light source of the plurality of light sources emitting shorter wavelength light.

4. A planar light source according to claim 1, wherein the plurality of light sources include red, green, and blue light emitting diodes.

5. A liquid crystal display device, comprising:
a planar light source device according to claim 1; and
a liquid crystal panel placed above an emission surface of the planar light source, the liquid crystal panel having two substrates with a liquid crystal layer interposed therebetween.

6. A liquid crystal display device according to claim 5, wherein the different light sources have different light emission angles in order that wavelength dependence of transmittance at a viewing direction in the liquid crystal panel is canceled out by wavelength dependence of luminance at the viewing direction in the planar light source device.

7. A planar light source device, comprising:
a plurality of light sources emitting different colors of light;
a light guide plate receiving light from the plurality of light sources at a side face to distribute the light over a surface thereof; and
a plurality of refractors, each of the refractors being configured to refract light from each of the plurality of light sources, wherein:
a shape of each of the refractors is different for each color of the plurality of light sources; and
a refraction angle of each of the refractors is different for each color of the plurality of light sources.

8. A planar light source device according to claim 7, wherein:
each of the refractors is formed on a side face of the light guide plate facing the plurality of light sources.

9. A planar light source device according to claim 7, further comprising a prism plate mounted between the plurality of light sources and the light guide plate, wherein:
each of the refractors is formed on a side face of the prism plate facing the plurality of light sources.

10. A planar light source device according to claim 7, wherein a refraction angle of the light source with longer wavelength light is smaller than a refraction angle of the light source with shorter wavelength light.

11. A planar light source device according to claim 7, wherein the plurality of light sources include red, green, and blue light emitting diodes.

12. A liquid crystal display device, comprising:
a planar light source device according to claim 7; and
a liquid crystal panel placed above an emission surface of the planar light source, the liquid crystal panel having two substrates with a liquid crystal layer interposed therebetween.

13. A liquid crystal display device according to claim 12, wherein the different refraction angles for different colors of light are provided in order that wavelength dependence of transmittance at a viewing direction in the liquid crystal panel is canceled out by wavelength dependence of luminance at the viewing direction in the planar light source device.

14. A liquid crystal display device, comprising:
a planar light source comprising a light source; a light guide plate configured to receive light from the light source at a side face to distribute the light over a surface thereof, and a hologram configured to diffract light at different angles; and
a liquid crystal panel placed above an emission surface of the planar light source, the liquid crystal panel having two substrates with a liquid crystal layer interposed therebetween,
wherein the hologram is arranged in order that wavelength dependence of transmittance at a viewing direction in the liquid crystal panel is canceled out by wavelength dependence of luminance at the viewing direction in the planar light source device; and wherein the hologram is placed between the light source and the light guide plate.

15. The liquid crystal display device according to claim 14, wherein the hologram diffracts longer wavelength light at an angle and diffracts shorter wavelength light at a larger angle than the angle of the longer wavelength light.

* * * * *